Patented Sept. 22, 1931

1,824,443

UNITED STATES PATENT OFFICE

JAMES W. MOOREHEAD, OF ZELIENOPLE, PENNSYLVANIA

LUBRICANT

No Drawing.  Application filed June 14, 1927.  Serial No. 198,871.

My invention relates to lubricants and particularly to a dressing for brake linings. In the use of brake linings in contact with brake drums there is a tendency for the surface of the brake linings to become coated or glazed with a metallic deposit. The glazed surface is very hard and stiff and, upon an application of the brake, an appreciable amount of undesirable heat is generated unless properly lubricated. The glazed area of the lining reacts with the material of the brake drum in a manner analogous to the action of two metallic members bearing against each other without the interposition of a lubricant. Such surfaces when heated have a tendency to seize each other with a resultant noisy chattering or gripping action. If the brake lining becomes hot enough, it may seize the brake drum and lock it. This action is also due in part to the internal resistance of the dry brake lining. Under such conditions the material of the brake lining is subjected to excessive longitudinal stresses that tend to reduce its thickness and harden it at the bearing surfaces.

Sand or grit are sometimes applied to a brake lining for the purpose of removing the glazed surface. The application of grit, however, while removing the glaze, also wears away the surface of the lining, as it is necessary to cause considerable abrasive action between the drum and lining in order to remove the glaze and squeak.

I provide a dressing for brake linings in which a waterproofing, friction and lubricating material is mixed with lubricating oil. The character of the dressing is such that it affords lubricating and frictional engagement between the brake and drum immediately upon the first application without necessitating the loss of time and energy necessary for uniformly distributing grease, graphite and the like over the surface of the lining. The presence of the waterproofing and frictional material provides frictional engagement between the brake lining and brake drum under wet conditions, as it is carried into the fabric of the brake lining with the lubricating oil if the character of the lining permits penetration. With impenetrable lining materials the lubricant is only effective at the braking surfaces. The application of the dressing to the lining renders it pliable, makes it waterproof, restores the material of the brake lining to its natural condition, prevents the formation of a glazed surface on the brake lining and reduces the smoke and fire hazard by providing a soft pliable braking surface and materially increases the life of the lining.

A present preferred composition of the lubricant is:

1½ pounds of rosin.
36 pounds of castor oil.
12 pounds of neat's foot oil.

A penetrating liquid may be added, if desired, that may have the additional properties of coloring and deodorizing the lubricant. A suitable penetrating liquid is three pounds coal tar thinner oil and three pounds of turpentine, the thinner oil being a solvent naphtha derived by coal distillation.

The presence of the rosin in the solution provides a frictional material between the brake lining and drum. The rosin gives the solution such a quality that a frictional surface is provided immediately upon the application of the dressing; thereby preventing slipping of the brake by reason of the presence of an excess of the lubricating oil. The rosin as a part of the solution penetrates the lining and thereafter continuously provides a frictional surface during the life of the brake lining. When lubricating oil alone is supplied, the brake tends to slip until the lining absorbs enough oil to become quiet. The dressing instantly eliminates squeaks and improves the efficiency of the brake.

Rubber dissolved in chloroform, chicle gum or their equivalents, may be substituted for the rosin. A mineral oil may be substituted for the castor oil and a vegetable oil may be substituted for the neat's-foot oil. In any substitution of oils it is desirable, but not essential, that one of the lubricating oils be of vegetable origin in order to prolong the life of the material contained in the brake lining.

Accordingly, I have provided a dressing for brake linings that is characterized by the presence of a waterproofing and frictional substance added to lubricating oil. The waterproofing and frictional substance serves to add a frictional surface to the brake lining immediately upon its application. The lubricant in penetrating the lining carries with it the substance which renders the brake lining pliable, waterproofed and thoroughly lubricated. The dressing is also useful as a dressing for leather and fabric goods, such as belts, shoes, harness and the like.

It is to be understood that various changes may be made in the composition of the lubricant without departing from the scope of the appended claims.

I claim:

1. A dressing for brake lining consisting of rosin, castor oil, neat's-foot oil, thinner oil comprising heavy crude solvent naphtha from coal distillation, and turpentine.

2. A dressing for brake lining consisting of substantially by weight 1½ parts rosin, 36 parts castor oil, 12 parts neat's-foot oil, 3 parts thinner oil comprising heavy crude solvent naphtha from coal distillation, and 3 parts turpentine.

In testimony whereof I have hereunto set my hand.

JAMES W. MOOREHEAD.